United States Patent Office 2,998,310
Patented Aug. 29, 1961

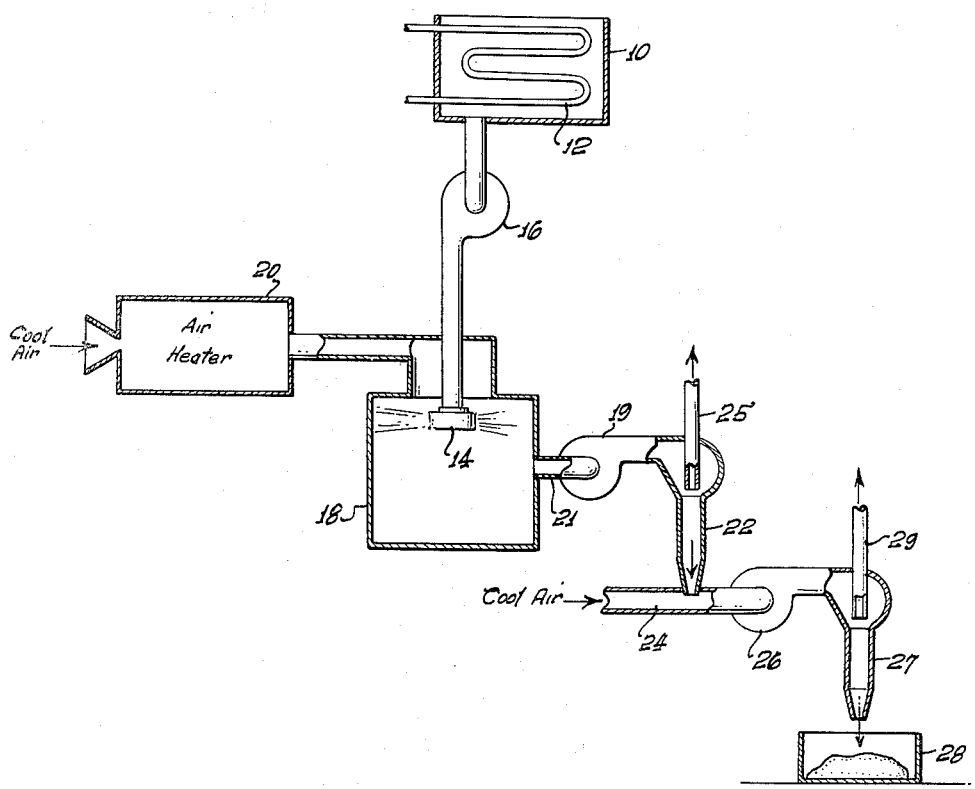

2,998,310
AMORPHOUS SODIUM BORATE COMPOSITION
Patrick J. O'Brien, Long Beach, and George A. Connell, Los Angeles, Calif., assignors to United States Borax & Chemical Corporation, Los Angeles, Calif., a corporation of Nevada
Filed Jan 24, 1958, Ser. No. 710,981
2 Claims. (Cl. 71—2.2)

This invention is concerned generally with inorganic water soluble materials and their preparation in such physical form that they are stable and non-caking under practical conditions of storage, and have novel and useful characteristics when utilized to form solutions. Among the characteristics exhibited by such compositions is the fact that they are particularly readily soluble, and are directly soluble to a higher concentration than previously available materials of corresponding overall chemical composition.

Many water soluble materials, in their previously available forms, have a relatively large negative heat of solution in water. When such materials are dissolved, the absorption of heat tends to cool the solution, impeding the process of dissolution. Particularly when a solution of relatively high concentration is required, such cooling may be quite troublesome. Materials prepared in accordance with the present invention have the novel and outstanding advantage that their heat of solution is relatively low, or even positive. Solution of such materials can be carried out even to high concentrations without appreciable reduction of the original water temperature, or without any temperature reduction at all.

It has been discovered that such readily soluble solid compositions consisting essentially of sodium borate and containing only a moderate concentration of water of hydration can be prepared in homogeneous solid form throughout the range of the molar ratio $Na_2O/B_2O_3$ from about 0.15 to about 0.3. Compositions having overall values of that ratio in the stated range have previously been prepared in non-homogeneous form as by mixing together granular sodium tetraborate and granular sodiumpentaborate or boric acid in suitable proportions. The new homogeneous compositions have many advantages over such mechanical mixtures. Being homogeneous, they are not subject to segregation of the components. Moreover, when prepared in accordance with the present invention, such compositions have been found to dissolve more readily and to a greater concentration in aqueous solution than any previously available compositions. Those and other highly desirable properties are believed to be associated with the fact that the compositions of the present invention are substantially completely amorphous in nature, in contrast to the products of ordinary calcining operations which contain appreciable amounts of crystalline material.

Moreover, for ready solubility it is highly desirable that a solid composition be relatively finely divided. A particular advantage of the present invention is that it leads to relatively finely divided material, typically less than about 200 mesh, which is nevertheless satisfactorily free-flowing and resistant to caking during normal storage. That characteristic constitutes a particularly important advantage, since previously available materials have tended to cake, especially when ground to comparable fineness. Such caking of previous compositions may well be associated with the appreciable proportion of crystalline material that they contain. Their tendency to caking is believed also to be due in part to the irregular configuration that results from grinding such materials. The products of the present invention, on the contrary, are homogeneous and substantially completely amorphous; and, even when very finely divided, the surfaces of the individual particles are typically smooth and free from fractures.

A typical example of a commercial operation in which such considerations are of great practical importance is found in the preparation of water solutions for use in killing weeds, defoliating plants, and the like. For that purpose, relatively concentrated solutions of sodium borate and also solutions containing both sodium chlorate and sodium borate are frequently used, the borate in the latter case performing the necessary function of preventing fire risk, as well as prolonging the weed-killing effectiveness of the composition. The utilization of calcined borax as a component in solid compositions for preparing supersaturated solutions for weed killing and other purposes is described and claimed in the copending patent application entitled "Supersaturated Borax Solutions and Methods and Compositions for Producing Same," Serial No. 117,878, filed September 26, 1949, by George A. Connell, now Patent 2,643,947. The stabilization of such supersaturated solutions by certain stabilizing agents is described and claimed in the copending patent application of Donald S. Taylor and George A. Connell, Serial No. 117,806, filed September 26, 1949, under the title, "Stabilization of Borax Supersaturation in Solutions," now Patent No. 2,662,810, December 15, 1953.

Solutions for use in weed killing are ordinarily prepared in the field with relatively simple portable equipment. It is usually inconvenient or highly impractical to heat the water, which may be initially quite cold. The rather large negative heats of solution of the solid chlorate and borates that have hitherto been employed for preparing such solutions produce a further reduction of water temperature. That reduction may typically be as great as 10 or 15° F. The resulting solution temperature is often so low that the proper concentration of solutes is difficult or impossible to attain.

It has been discovered that such solid compositions as sodium chlorate and various sodium borates can be prepared in such form that they can be dissolved more readily and to a higher concentration than the previously available materials. Moreover, solution of the new materials does not lower the solution temperature, but actually raises it slightly, promoting solution and greatly reducing the chance that an undissolved residue may remain in the dissolving tank. A further advantage of the new form for such compositions is the fact that the various ingredients are homogeneously distributed not only throughout the material as a whole, but even within each particle, thus making segregation of the ingredients impossible. That prevention of segregation is of particularly critical importance when one ingredient is sodium chlorate, which, by itself, may produce a serious fire hazard. The novel properties and the preparation of such compositions that include sodium chlorate are more particularly described and are claimed in our Patent No. 2,690,387, which issued September 28, 1954, on our application Ser. No. 181,958, filed August 29, 1950; and of which application this present application is a continuation in part via our co-pending application Ser. No. 458,444, filed September 27, 1954, now abandoned; the present application being a direct continuation in part of the latter application.

The present application is concerned more particularly with homogeneous compositions consisting essentially of partially hydrated sodium borate. When prepared in accordance with the invention, such compositions are substantially completely amorphous, in spite of the presence of water of hydration which normally leaks to an appreciable crystalline content. Such borate compositions, having any desired molar ratio of $Na_2O/B_2O_3$ from about 0.15 to about 0.3, may be produced in accordance with the present invention by first forming a water solution of the various ingredients in the proportions in which they are desired to appear in the final solid composition. Those ingredients typically consist essentially of a mixture of such soluble compounds as boric acid, sodium pentaborate, sodium tetraborate and sodium metaborate, for example, in such proportions as to yield the desired molar ratio $Na_2O/B_2O_3$. In the special case of ratio 0.20, the solution may contain such a mixture or may be prepared from sodium pentaborate alone. Water is then evaporated very rapidly from that solution, leaving the solutes in solid form. To insure rapid removal of water from the solution, the latter may be spread at elevated temperature into a thin film, as on a hot plate or on the heated roll of a drum dryer; or is otherwise divided to increase the relative surface area through which evaporation may take place. The preferred method of evaporation is by spraying the solution at moderately elevated temperature into a stream of hot and relatively dry air. The droplets of the spray become substantially dry, and preferably also are cooled nearly to room temperature, while still carried in the air stream and before striking any solid wall of the enclosure. Each droplet thus produces a generally spherical solid particle containing each ingredient in the initial solution proportions. Although superficially dry, the resulting solid composition may include an appreciable proportion of water, preferably between about 0.5 and about 1.0 mol of water per mol of $B_2O_3$, the exact amount of water and the average size of the particles depending primarily upon the particular spraying and drying conditions used.

The invention is particularly useful for preparing sodium borate compositions in the range of molar ratios of $Na_2O/B_2O_3$ between about 0.22 and about 0.30. Compositions having ratios in that range dissolve particularly readily and are capable of producing solutions that are supersaturated to a greater degree and that contain a higher concentration of $B_2O_3$ than was previously considered possible. No previous description is known of homogeneous products consisting essentially of partially hydrated sodium borate and having sodium to boron ratio in that range. Nor have such products previously been prepared in substantially completely amorphous form and having the high degree of solubility and other useful properties provided by the present invention.

A clear understanding of the invention and its further objects and advantages will be had from the following description of a typical preferred manner in which it may be carried out, it being understood that many changes may be made in specific details of the described procedure and that equivalent methods may be used without departing from the scope of the invention. The accompanying drawing illustrates schematically a typical spray drying apparatus, by which the invention may be carried out in its preferred form. For clarity of illustration, certain well known practical details of the apparatus are omitted in the drawing. The required ingredients are first dissolved to form an aqueous solution, stored in supply tank 10. That solution may be heated, as by a steam coil 12, in increase the solubility of the solutes, it being in general economical to employ as highly concentrated a solution as possible. Under suitable conditions, the feed solution may be supersaturated.

Solution is fed from tank 10 to a spray nozzle 14, preferably of centrifugal type, as by gravity or by a suitably powered pump indicated at 16, forming a fine mist of solution within a spray chamber 18. Air or other suitable gas is circulated continuously, as by a power driven fan 19, through a heater 20, through spray chamber 18 and to a separator, preferably of cyclone type, indicated at 22. Conditions are so adjusted that the spray droplets from nozzle 14 become superficially dry while suspended in the stream of hot air within drying chamber 18, forming an air suspension of particles of solid material. Those particles are carried with the air stream to separator 22, from which they are delivered at 24, the air being vented as at 25. A current of cool air is preferably drawn past the delivery point 24 of separator 22, redispersing and cooling the particles. As illustrated, a second fan 26 delivers that cool suspension to a second separator 27, from which the finally dried and cooled solid particles are deposited at 28, and the air is vented at 29.

For typical operation of a system of the type described, the solution is fed to spray nozzle 14 at a temperature of approximatel 200° F. and at substantially saturated concentration. The air entering drying chamber 18 may have a temperature of the order of 700° F., depending somewhat upon the characteristics of the material being processed. With suitable regulation, the evaporation of water from the sprayed solution lowers that temperature to approximately 200 to 300° F. at outlet 21 from chamber 18. That entire drying step is preferably completed in a relatively short time, typically of the order of about 5 seconds. After resuspension of the particles in cool air at 24, that temperature may be further reduced to 150° or less before the particles reach separator 27, the solid material thus being delivered at 28 at approximately the latter temperature.

It has been discovered that when solutions of sodium borates are spray dried by the general type of process described above, the resulting solid particles are found to go into solution very rapidly and to form clear solutions even at concentrations that represent quite extreme supersaturation with respect to borate. Furthermore, that solution takes place typically without any cooling of the water, and in many instances the heat of solution even raises the temperature of the water several degrees. All of those characteristics are highly desirable in numerous commercial products, of which weed killing preparations are typical.

Two illustrative compositions, prepared in accordance with the present invention, are given in the accompanying Table I, and are identified as products A and B. For each composition listed, the ingredients from which the initial solution was prepared are given as per cent by weight of the solution. The chemical compositions of the respective final products, as determined by standard analytical procedures, are given in the table, as well as the apparent density and the molar ratio $Na_2O/B_2O_3$. The slightly greater proportion of $Na_2O$ in products A and B, as compared with the initial ingredients, is believed to be due to a barely noticeable contamination of the heated air with sodium tetraborate from the furnace 20 which was used in those particular runs.

Table I

| Hot Solution Made From— | Product A | Product B |
| --- | --- | --- |
| Percent $H_3BO_3$ | 36.3 | 34.4 |
| Percent $Na_2B_4O_7.10H_2O$ | 37.4 | 49.8 |
| Percent $H_2O$ | 26.3 | 15.8 |
| Product Analysis: | | |
| Percent $Na_2O$ | 13.47 | 15.02 |
| Percent $B_2O_3$ | 71.2 | 68.2 |
| Percent $H_2O$ (calc.) | 15.35 | 16.8 |
| $Na_2O/B_2O_3$ (molar) | 0.21 | 0.25 |
| Apparent Density | 0.32 | 0.38 |

Table II gives the results of analysis of three further illustrative compositions, which are identified as products C, D and E, respectively, and which were produced by spray drying sodium borate solutions in the manner already described.

Table II

| Product Analysis | Product C | Product D | Product E |
| --- | --- | --- | --- |
| Percent $Na_2O$ | 12.2 | 16.1 | 14.4 |
| Percent $B_2O_3$ | 68.8 | 64.6 | 66.6 |
| Percent $H_2O$ (calc.) | 19.0 | 19.3 | 19.0 |
| $Na_2O/B_2O_3$ (molar) | 0.20 | 0.28 | 0.24 |

The listed products all contain some residual water, the molar ratio of $H_2O$ to $B_2O_3$ varying within the approximate range between 0.5 and 1.0. That water appears to be associated with the $B_2O_3$ content of the product, although its presence does not result in the appearance of any crystalline borates. Compositions may be prepared in accordance with the invention comprising between about 10 and about 20% $Na_2O$, between about 65 and about 80% $B_2O_3$, and between about 10 and about 20% $H_2O$.

All of the illustrative products of the table can be dissolved directly in water to give a solution that is highly supersaturated. For example, product E was added to water at the rate of 4.17 pounds per gallon at about 25° C. The resulting solution, after 15 minutes of continuous stirring, was found to contain 21.8% $B_2O_3$. A corresponding mixture of borax and sodium pentaborate, added to water at the same rate and under the same conditions, gave a solution containing only 12.2% $B_2O_3$, corresponding substantially to the normal equilibrium solubility. At the ratio 0.20, corresponding to sodium pentaborate, a product in accordance with the invention was found to dissolve directly to a concentration of about 15.5% $B_2O_3$, in contrast to a normal solubility of soduim pentaborate under the same conditions of only about 10.5%. The degree of supersaturation obtained with products in accordance with the invention generally increases with increasing value of the molar ratio $Na_2O/B_2O_3$ up to a value of about 0.3. If corresponding mixtures of borax and boric acid or sodium pentaborate are first dehydrated by conventional means and then directly dissolved under the same conditions, solutions may be obtained that are appreciably supersaturated, in accordance with the disclosure of Patent 2,643,947, already referred to. However, the degree of supersaturation so obtained is less than that produced by the homogeneous products of the present invention. The superiority of the present products is believed to be closely associated with their novel physical nature, and particularly with the fact that they are substantially completely amorphous.

The amorphous nature of the illustrative products described in the table has been demonstrated by means of X-ray powder photographs. Such photographs have been taken of each of the products of the table, with exposures ranging from 3 hours to 12 hours. None of those photographs showed any well-defined crystal lines. Directly comparable photographs of corresponding mixtures dehydrated by conventional procedures show rich line patterns that clearly demonstrate the presence of appreciable proportions of crystalline material.

Products prepared in accordance with the described preferred form of the invention comprise particles of sufficiently small size that no further grinding or similar processing is necessary or desirable. Such particles are typically substantially all less than 200 mesh, with an appreciable proportion less than 350 mesh. Yet, unlike solid material that has been reduced in size by grinding, the surface of each particle tends to be smooth and without sharp corners and edges. That characteristic is believed to be largely responsible for the fact that such products do not cake appreciably during normal storage, whereas normally calcined materials, especially those involving non-homogeneous mixtures, typically exhibit a marked and troublesome tendency to cake. That tendency ordinarily becomes more serious as the particle size of the composition is decreased by grinding. The present invention provides sodium borate compositions of variable sodium to boron ratio that combine the advantages of relatively fine particle size with effectively stable free-flowing characteristics.

As compared with the composition mixture of the Connell Patent 2,643,947, referred to, the product of the present invention has several important advantages, among which are the following. The present product is non-segregating, as it is homogeneous in the sense that each particle contains its chosen proportion of all the initial ingredients. The material of the patent is subject to segregation of the several ingredients of its mixture. The material of the patent is subject also to severe caking after any extended storage, and after caking it is difficult to dissolve, whereas the present product remains readily dissolvable indefinitely. And solution of the present product is exothermic, raising the temperature of the solvent water to facilitate solution; whereas that of the Connell patent is definitely endothermic, lowering the temperature.

In addition to the examples previously given, of selection of initial ingredients for formation of the solution to be spray-dried, other selections may be made of two or more of the four initial ingredients previously named, to obtain solutions having the desired molar ratio $Na_2O/B_2O_3$. Such selection to obtain desired ratios is well known to those familiar with the chemistry of sodium borates. For example, where the molar ratio of one of the selected ingredients is greater than the desired ratio, admixture of a calculatable amount of boric acid or of another borate with a lower ratio, will low the ratio for the solution.

For example, to obtain a molar ratio in the solution of 0.25, the solution may be made up as follows (percentages by weight):

Table III

| | Percent |
|---|---|
| Boric acid, $H_3BO_3$ | 46.6 |
| Sodium metaborate, $Na_2B_2O_4 \cdot 8H_2O$ | 34.7 |
| Water, $H_2O$ | 19.7 |

Table IV

| | |
|---|---|
| Sodium pentaborate, $Na_2B_{10}O_{16} \cdot 10H_2O$ | 49.3 |
| Borax, $Na_2B_4O_7 \cdot 10H_2O$ | 15.9 |
| Water, $H_2O$ | 32.8 |

Additionally, the solution of that same molar ratio may be prepared as follows:

Table V

| | Percent |
|---|---|
| Boric acid, $H_3BO_3$ | 62.2 |
| Sodium hydroxide, $NaOH$ | 10.2 |
| Water, $H_2O$ | 27.6 |

Table VI

| | |
|---|---|
| Borax, $Na_2B_4O_7 \cdot 10H_2O$ | 79.6 |
| Sulfuric acid, $H_2SO_4$ | 20.4 |

All the solutions, made in accordance with any of the examples given, are identical, at any chosen $Na_2O/B_2O_3$ ratio, with regard to their $Na_2O$ and $B_2O_3$ content. The last example differs from the others only in that the solution contains, in addition to those oxides, sodium sulfate as a reaction product; the reaction producing the water for the solution. All these identical solutions, including the last one produce, on spray drying, products of the same characteristics as before described.

We claim:

1. A water-soluble amorphous sodium borate having from about 10 to about 20% by weight of water of hydration, consisting essentially of sodium and boron oxides present in a molar ratio of $Na_2O:B_2O_3$ of from about 0.15 to about 0.3, which yields aqueous solutions super-saturated with $Na_2O$ and $B_2O_3$ values with a positive heat of solution, said amorphous sodium borate produced by dissolving in water at least two materials selected from the group consisting of sodium metaborate, sodium tetraborate, sodium pentaborate and boric acid, said materials present in such proportions as to yield said molar ratio, and rapidly evaporating the water from the solution.

2. A water-soluble amorphous sodium borate consisting essentially of from about 10 to about 20% $Na_2O$, from about 65 to about 80% $B_2O_3$, and from about 10 to about 20% of the total weight of $Na_2O$ and $B_2O_3$ of water of hydration, which yields aqueous solutions saturated with $Na_2O$ and $B_2O_3$ values with a positive heat of solution substantially greater than zero, said amorphous sodium borate produced by dissolving in water at least two materials selected from the group consisting of sodium metaborate, sodium tetraborate, sodium pentaborate and boric acid, said materials dissolved in water in such proportions so as to yield the said $Na_2O$ and $B_2O_3$ content and rapidly evaporating the water from the solution.

References Cited in the file of this patent

UNITED STATES PATENTS

| | | |
|---|---|---|
| 1,026,724 | Trump et al. | May 21, 1912 |
| 2,643,947 | Connell | June 30, 1953 |
| 2,662,810 | Taylor et al. | Dec. 15, 1953 |
| 2,690,387 | O'Brien et al. | Sept. 28, 1954 |
| 2,700,604 | Knight | Jan. 25, 1955 |

OTHER REFERENCES

Krause: "Krause Process," publication of Chemical Construction Co., Charlotte, N.C., 1927.

Mellor: "Comprehensive Treatise on Inorganic and Theoretical Chemistry," 1924, vol. 5, page 70.